March 11, 1924.
E. JENSEN
1,486,757
METHOD OF AUTOMATIC REGULATION OF THE SUPPLY OF OXIDIZING AGENTS,
SUCH AS NITRIC ACID, NITRATE SOLUTION, OR OTHERS IN THE
MANUFACTURE OF SULPHURIC ACID
Filed May 31, 1923
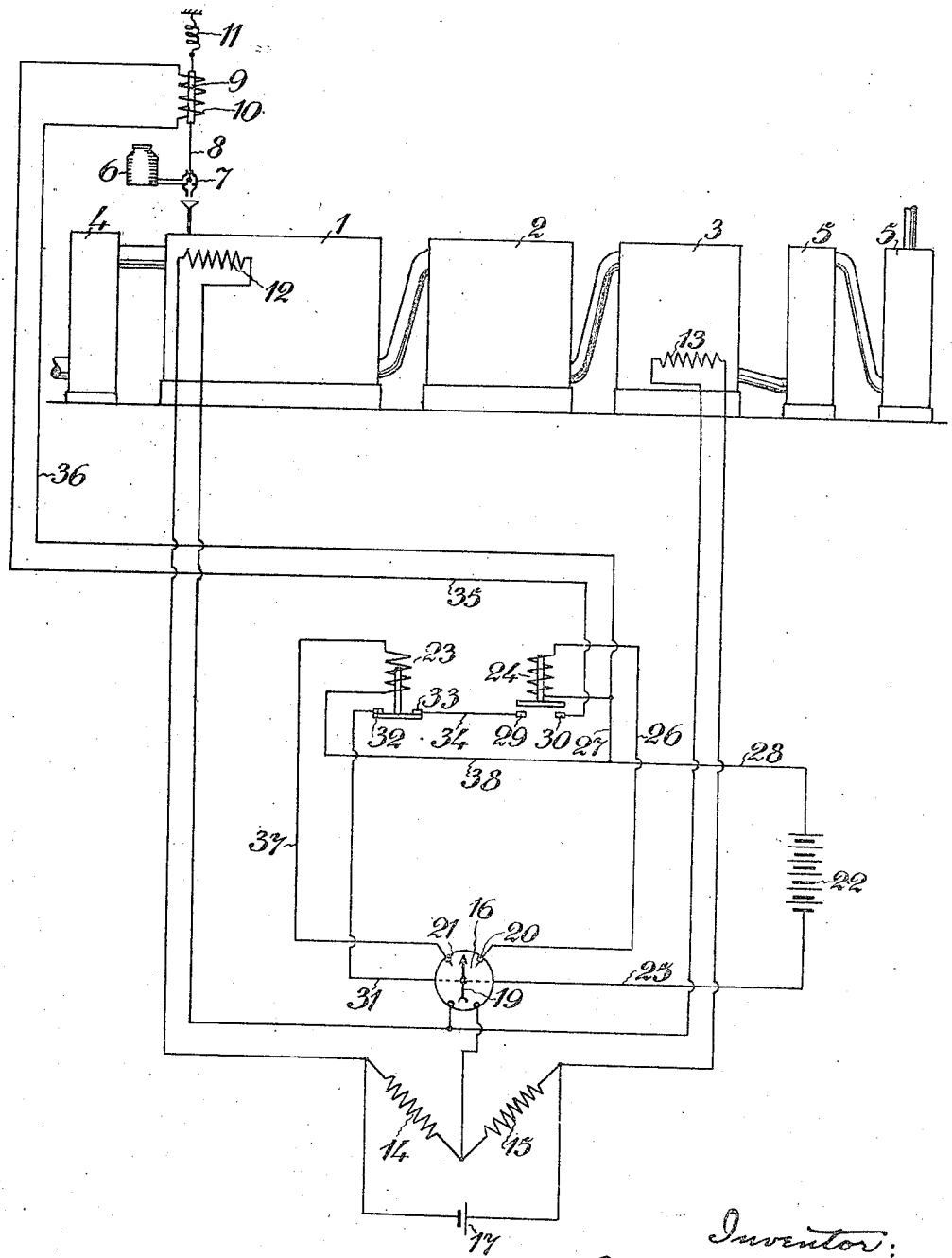

Patented Mar. 11, 1924.

1,486,757

UNITED STATES PATENT OFFICE.

ERNST JENSEN, OF THE HAGUE, NETHERLANDS.

METHOD OF AUTOMATIC REGULATION OF THE SUPPLY OF OXIDIZING AGENTS, SUCH AS NITRIC ACID, NITRATE SOLUTION, OR OTHERS IN THE MANUFACTURE OF SULPHURIC ACID.

Application filed May 31, 1923. Serial No. 642,682.

*To all whom it may concern:*

Be it known that I, ERNST JENSEN, a subject of the King of Denmark, residing at 117 Stadhouderslaan, The Hague, Netherlands, have invented new and useful Improvements relating to the method of automatic regulation of the supply of oxidizing agents, such as nitric acid, nitrate solution, or others in the manufacture of sulphuric acid; and I do hereby declare the following to be a full, clear, and exact description of the same.

The manufacture of sulphuric acid in chamber systems, tower systems and the like requires that nitric acid or other nitrogen-oxides yielding substance be continuously supplied in quantity corresponding to the loss of nitrogen oxides incurred in the process.

One of the principal conditions for obtaining the lowest possible consumption of oxidizing agent is that the supply of oxidizing agents takes place as regularly as possible and that the supply corresponds to the quantity of sulphur dioxide entering into the chamber plant. The regulation of this supply has hitherto been effected by the operator of the plant by adjusting a cock, and experience shows that this method is rather defective. Experiments have been made with the introduction of the oxidizing agents in quantities varying with the variations of the temperature of the first chamber. In such case the regulation of the supply of oxidizing agent is effected by means of an electrically controlled cock in such a manner that as the temperature in the first chamber increases the supply of oxidizing agents is checked, and as the temperature in the chamber decreases the supply of oxidizing agent is increased. This method was based upon the supposition that in a normal chamber plant the supply of $SO_2$ plus $SO_3$ is nearly constant, and that a decreasing temperature is due to lack of oxidizing agents. This supposition, however, does not hold good in practice, as alteration in the draught conditions, stoppage of the pyrite furnaces and numerous other conditions frequently cause changes in the quantities of $SO_2$ plus $SO_3$ supplied to the chambers and therefore a regulation of the introduction of oxidizing agents depending on the variations of temperature in the first chamber will not lead to satisfactory results owing to the fact that when the decreasing temperature is due to a decrease in the supply of $SO_2$ plus $SO_3$, the controlling instrument will effect an increased supply of the oxidizing agent, although the supply should have been reduced. In this case then the automatic regulation gives a result opposite to what is aimed at.

According to the present invention it has been endeavoured to regulate the admission of oxidizing agents according to the following principles:

In chamber plants for the manufacture of sulphuric acid there will always exist a certain difference between the temperatures of the gases in the first chamber and the gases in the last chamber, corresponding to the most favourable conditions for the sulphuric acid forming processes, namely that giving the greatest output of sulphuric acid with the smallest consumption of oxidizing agent.

In a given plant in regular working this difference of temperature is nearly constant. It is upon this observation that the principle of the regulation of the admission of oxidizing agent in accordance with the present invention is based. This difference of temperature varies according to the construction and size of the various plants, but in ordinary chamber plants it lies between 25° and 60° C.

When in ordinary working a constant current of the oxidizing agent is supplied, corresponding to the quantity of the oxidizing agent lost during the same time, experience shows that the greatest economy is obtained, and that the said difference of temperature is almost constant.

If the admission of oxidizing agent is increased, a change of temperature in all the chambers occurs, causing the difference of temperature between the first and the last chamber to increase. If on the other hand the quantity of the oxidizing agent is reduced, the course of the reaction will change and a change of temperature will occur causing a diminution of the said difference of temperature.

These variations of the difference of temperature are, according to this invention, used for automatically controlling the admission of the oxidizing agent in the manner described below.

In the drawing annexed are diagrammatically shown parts of a chamber plant equipped with an arrangement for electrically controlling the admission of nitric acid, nitrate solution or other oxidizing agent in accordance with the method forming the subject matter of the invention but it is to be understood that the invention is not restricted to the use of the means illustrated. Thus other temperature sensitive means, such as air filled containers or air thermometers, can be used for the purpose and the apparatus shown only represents one of the means we have used for carrying out the invention in practice.

The chamber plant shown consists of three chambers 1, 2 and 3, a Glover tower 4 and Gay-Lussac towers 5, 5. 6 is a container for nitrate solution or other oxidizing substance from which the liquid is admitted to the first chamber 1 through an electrically controlled valve 7, the stem 8 of which is connected with the iron core 9 of a solenoid 10 which iron core is suspended by a spring 11 as indicated.

In the chambers 1 and 3 electrical resistances, 12 and 13 respectively, which are sensitive to variations of their temperatures are inserted and they are connected with two proportionate resistances 14 and 15 and a galvanometer 16 and a measuring cell 17 to form a Wheatstone bridge, so that the difference between the temperatures of the first and the last chamber can be measured by means of the galvanometer. The zero position of the galvanometer hand 19 corresponds to the difference of temperature which is to be maintained between the said first and last chambers. On the scale of the galvanometer is placed a maximum contact piece 20 and a minimum contact piece 21, so that the hand of the galvanometer, when touching one of these contacts closes or interrupts the current from a local battery 22. This current controls the valve 7 which controls the supply of oxidizing agents by means of two relays 23 and 24 in the following manner.

When the difference of temperature at the places of measurement has assumed its maximum, the galvanometer's hand 19 will make contact with the contact piece 20. Hereby a local circuit is closed as follows: from one pole of the battery 22 through wire 25, hand 19, contact piece 20, wire 26, coil of relay 24, wires 27 and 28 to the other pole of the battery 22. The current causes the relay 24 to make connection between the contact elements 29 and 30, and thereby is closed the following controlling circuit: from one pole of the battery 22 through wires 25 and 31, contact elements 32 and 33 of the relay 23, wire 34, contact elements 29 and 30, wire 35, coil of solenoid 10, wires 36, 27 and 28 to the other pole of the battery. The solenoid 10 thereby effects the closing of the valve 7, and admission of the oxidizing agent is stopped.

As described above, a change of temperature will now take place in all the chambers, causing a decreasing difference of temperature between the places of measurement where the resistances 12 and 13 are located.

The deviation of the hand 19 now decreases, and it will pass through the zero position and reach the minimum position, where it will make contact with the minimum contact piece 21. Hereby the following circuit is closed; from one pole of battery 22 through wire 25, hand 19, contact piece 21, wire 37, coil of relay 23, wires 38 and 28 to the other pole of battery 22. The current causes the relay 23 to interrupt the connection between the contact elements 32 and 33 and the controlling circuit through the solenoid 10 is interrupted. The valve 7 is now opened again and the admission of oxidizing agent is started again. The temperature in all the chambers will then again be subject to a change, and the difference of temperature between the measuring places is increased. The oxidizing agent is admitted constantly, until greater deviations from the normal temperature difference between the first and last chamber again occur.

The effecting of the controlling described above can be inversed, if simultaneously the controlling of the valve by the solenoid is altered in such a manner that the closing of the controlling circuit causes that the valve is opened, and vice versa.

If desired, the galvanometer can be adapted for recording of these fluctuations of the difference of temperature, thus effecting a survey of the working of the plant by day and by night.

In a certain plant the normal difference of temperture between the first and last chamber is for instance 40° and the zero position of the glavanometer's hand is adjusted to that point by suitable adjustment of the resistances. The maximum and minimum contact pieces are for instance adjusted at 41° and 39°. The control of the supply of the oxidizing agent will then take place as described above, and the apparatus will automatically endeavour to keep the difference between the temperature of the first and last chamber at about 40° with a deviation of one degree above and below this temperature.

The galvanometer can be adjusted with the zero position corresponding to another difference of temperature, and the maximum- and minimum-contact pieces can be adjusted so as to permit greater or smaller deviations from the normal difference than indicated above.

The described controlling apparatus can be connected with and control one or more apparatus admitting the oxidizing agents, for instance in such a way that these apparatus are controlled simultaneously, or one after the other. Furthermore the controlling apparatus can be connected with the admission device in such a manner that the regulation of the supply only takes place for part of the total supply, while the other part is admitted by means of a separate apparatus not automatically controlled. Finally the controlling system described can be adapted so as to control two or more admission apparatus for two or more first chambers, so that any of the admission apparatus are controlled according to the difference of temperature existing between the first and the last chamber in question.

Having thus fully described my invention I claim as new and desire to secure by Letters Patent:

1. Method of controlling the admission of oxidizing agents in the manufacture of sulphuric acid, characterized by the admission of the oxidizing agent being made dependent on the difference between the temperature of the gases when entering and when leaving the chambers of reaction of the plant.

2. Method of controlling the admission of oxidizing agents in the manufacture of sulphuric acid, characterized in that the admission of the oxidizing agent being checked when the difference between the entrance and the exit temperatures in the chambers of reaction of the plant has increased to a fixed value and is started again to its full extent when the said difference of temperature has decreased to a fixed value.

3. In the process for the manufacture of sulphuric acid by the chamber process the step which consists in maintaining a substantially constant temperature gradient in the reacting gases by varying the supply of oxidizing gases to the chambers.

4. In the process for the manufacture of sulphuric acid by the chamber process the steps which consist in determining the difference in temperatures of the gases in the first and the last chambers of the system most favorable to the process, increasing the supply of oxidizing agent as the difference between the temperatures of the gases in the first and last chambers of the system falls below said determined temperature difference, and decreasing the supply of oxidizing agent as the difference between the temperatures of the gases in the first and the last chambers of the system rises above said determined temperature difference, whereby said determined temperature difference is substantially maintained.

5. In the process for the manufacture of sulphuric acid by the chamber process the steps comprising increasing the supply of oxidizing agent when the fall in temperature of the gases in the system becomes less and decreasing the supply of oxidizing agent when the fall in temperature of the gases in the system becomes greater than a predetermined value.

In testimony whereof I have affixed my signature in presence of two witnesses.

ERNST JENSEN.

Witnesses:
W. UDLÆNHALK,
W. LUBBERT.